(12) United States Patent
Jog et al.

(10) Patent No.: US 9,363,229 B2
(45) Date of Patent: *Jun. 7, 2016

(54) DOMAIN NAME RESOLUTION FOR A HYBRID CLOUD CLUSTER

(75) Inventors: Mandar U. Jog, Cary, NC (US); Bart C. Vashaw, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 1040 days.

This patent is subject to a terminal disclaimer.

(21) Appl. No.: 13/407,114

(22) Filed: Feb. 28, 2012

(65) Prior Publication Data

US 2012/0215901 A1    Aug. 23, 2012

Related U.S. Application Data

(62) Division of application No. 12/982,820, filed on Dec. 30, 2010, now abandoned.

(51) Int. Cl.
 *G06F 15/173* (2006.01)
 *H04L 29/12* (2006.01)

(52) U.S. Cl.
 CPC ........ H04L 61/6013 (2013.01); H04L 61/1511 (2013.01); H04L 61/1552 (2013.01)

(58) Field of Classification Search
 CPC .............................. H04L 67/02; H04L 67/141
 USPC ......................... 709/217, 219, 223, 224, 225
 See application file for complete search history.

(56) References Cited

U.S. PATENT DOCUMENTS

| | | | |
|---|---|---|---|
| 5,777,989 A | 7/1998 | McGarvey | |
| 7,366,794 B2 | 4/2008 | Poeluev | |
| 8,140,669 B2 | 3/2012 | Christenson et al. | |
| 8,825,839 B2 * | 9/2014 | Brandt | H04L 61/1511 709/221 |
| 2003/0065785 A1 | 4/2003 | Jain | |
| 2008/0005342 A1 * | 1/2008 | Schneider | 709/230 |
| 2008/0086574 A1 | 4/2008 | Raciborski et al. | |
| 2009/0031028 A1 | 1/2009 | Kumar et al. | |
| 2010/0014536 A1 | 1/2010 | Lin et al. | |
| 2010/0106852 A1 * | 4/2010 | Kindig et al. | 709/231 |
| 2010/0124228 A1 | 5/2010 | Tinnakornsrisuphap et al. | |
| 2010/0186079 A1 | 7/2010 | Nice et al. | |
| 2010/0250668 A1 | 9/2010 | Toebes et al. | |

(Continued)

OTHER PUBLICATIONS

"Integrated DHCP, DNS, & IP Address Management Cisco Prime Network Registrar"—Charlie Mascari, Cisco, Sep. 2011 http://www.cisco.com/c/dam/en/us/products/collateral/cloud-systems-management/network-registrar/integrated_dhcp_dns_ip_management.pdf.*

*Primary Examiner* — Randy Scott
(74) *Attorney, Agent, or Firm* — Steven M. Greenberg, Esq.; CRGO Law

(57) ABSTRACT

Embodiments of the present invention provide a method, system and computer program product for domain name resolution for a hybrid cloud cluster. In an embodiment of the invention, a method for domain name resolution for a hybrid cloud cluster includes receiving a request for name resolution in a DNS name server proxy executing in memory of a host computer in a public cloud. Thereafter, it can be determined whether or not the request for name resolution implicates a domain name within an Intranet coupled to the proxy over a communications network. Finally, the request for name resolution can be resolved in a DNS name server disposed in the Intranet in response to determining the request to implicate a domain name within the Intranet.

4 Claims, 1 Drawing Sheet

(56) References Cited

U.S. PATENT DOCUMENTS

| | | | |
|---|---|---|---|
| 2011/0016473 A1* | 1/2011 | Srinivasan | 718/105 |
| 2011/0055385 A1 | 3/2011 | Tung et al. | |
| 2011/0197065 A1* | 8/2011 | Stauth et al. | 713/170 |
| 2011/0320598 A1 | 12/2011 | Solin | |
| 2012/0131162 A1* | 5/2012 | Brandt | H04L 41/04 709/223 |
| 2012/0167081 A1 | 6/2012 | Sedayao et al. | |

* cited by examiner

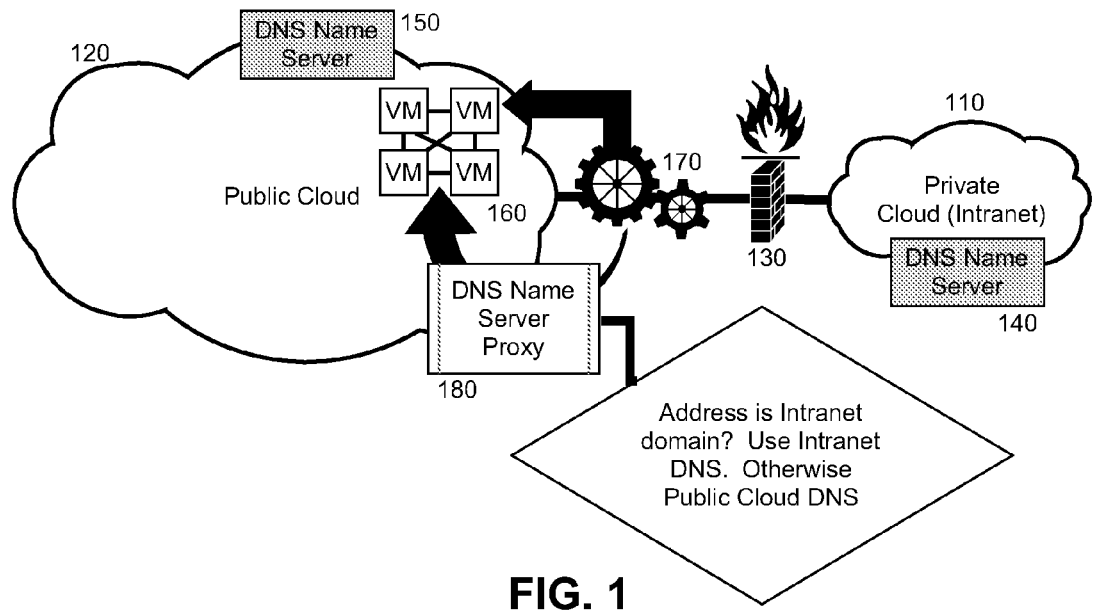
FIG. 1
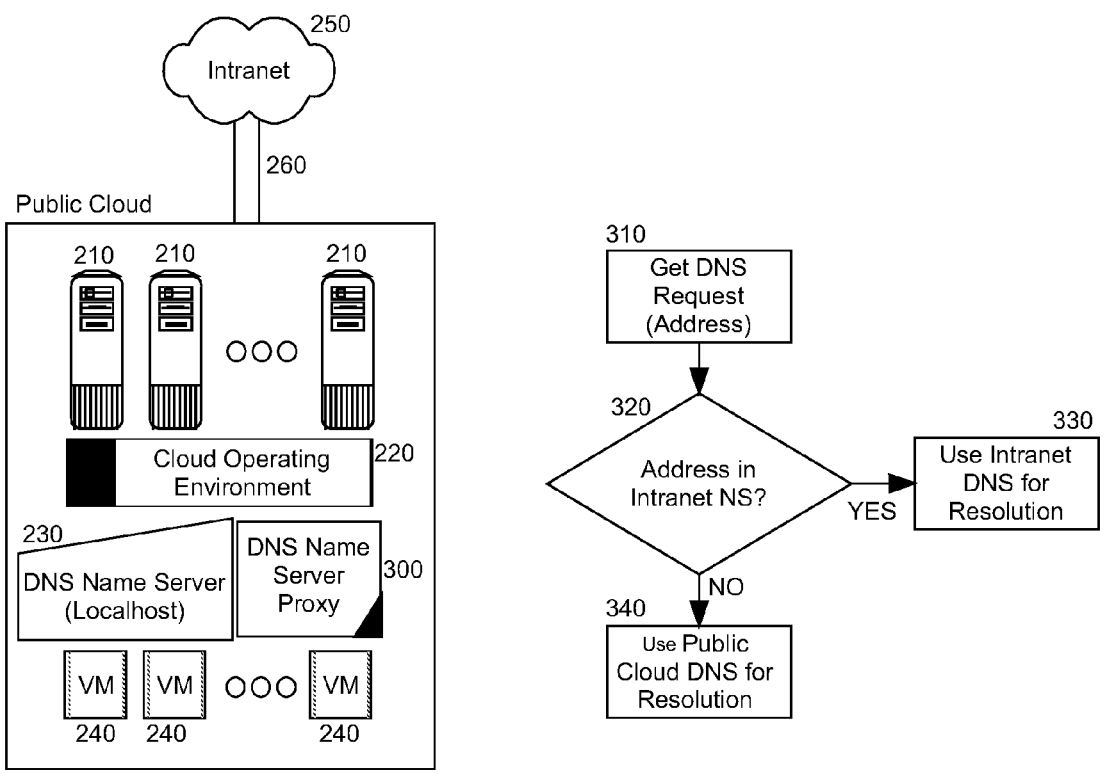
FIG. 2  FIG. 3

DOMAIN NAME RESOLUTION FOR A HYBRID CLOUD CLUSTER

CROSS-REFERENCE TO RELATED APPLICATIONS

This application is a Divisional of U.S. application Ser. No. 12/982,820, filed Dec. 30, 2010, now abandoned, the entirety of which is incorporated herein by reference.

BACKGROUND OF THE INVENTION

1. Field of the Invention

The present invention relates to hybrid cloud cluster deployment and more particularly to domain name resolution in a hybrid cloud cluster.

2. Description of the Related Art

Network computing, at its core, relates to the transport of data between addressable computing endpoints in a network of computing endpoints. Integral to network computing is the universal way in which data is addressed so as to be delivered to an intended end point. In this regard, the Internet protocol (IP) is the principal communications protocol used for relaying packets of data across an internetwork using the IP suite. Responsible for routing packets across network boundaries, IP is the primary protocol that establishes the Internet. The domain name system, however, remains the enabler of global computing by bridging the complexity of the IP address with a human factors friendly domain name.

The domain name system (DNS) is a hierarchical naming system built on a distributed database for computers, services, or any resource connected to the Internet or a private network. The domain name system associates various information with domain names assigned to each of the participating entities. Most importantly, the domain name system translates domain names meaningful to humans into the numerical identifiers associated with networking equipment for the purpose of locating and addressing these devices worldwide. The backbone of the domain name system is the DNS server. Each domain in the DNS enjoys at least one authoritative DNS name server that publishes information about that domain and the name servers of any domains subordinate to the domain. The top of the hierarchy is served by the root name servers—specifically, the servers to query when resolving a top-level domain name (TLD).

While the architecture and operation of the DNS has become a generally understood principal of computing in respect to the Internet, managing the DNS in a hybrid cloud computing environment is not without its challenges. In this regard, cloud computing refers to Internet-based computing in which shared resources, software, and information are provided to computers and other devices on demand, analogous to the delivery of power in the municipal electricity grid. Generally, the typical cloud computing infrastructure consists of services delivered through common centers and built on host servers. Clouds often appear as single points of access for the computing needs of the consumer. Further, commercial cloud computing offerings generally are expected to meet quality of service (QoS) requirements of customers, and typically include service level agreements (SLAs).

A hybrid cloud computing environment is one that consists of both public cloud machine instances (the "public cloud") and private cloud machine instances such as physical or virtual machines within the firewall, otherwise known as the Intranet or the private enterprise. A machine image can be securely dispensed into the public cloud and with the establishment of a secure tunnel, can be made to look as if the machine image is part of the private enterprise. It is also possible to deploy a set of machines according to some pattern, for instance a cluster can be deployed into specific public clouds. When this cluster is dispensed into the public cloud, it remains necessary for the set of machines in the public cloud to communicate with one another as well as with machines disposed within the Intranet. Thus, the machines in the public cloud must be able to resolve domain names in both the public cloud and the private enterprise.

The public cloud typically assigns machines both public and private hostnames that are resolvable to external and internal IP addresses, respectively. The internal addresses ensure internal-only resolution of addresses. Also, the private enterprise name is typically not resolvable in the Internet, but only within the Intranet. Thus, no one DNS name server can resolve both the internal names of the public cloud and also the internal names of the private enterprise. There are several ways that this difficulty has been addressed.

First, only private enterprise names have been used, but two drawbacks result: (1) all connections within the cluster now must traverse the Internet, through at least two secure pipes, and an exceptional performance penalty results large enough to likely be completely unacceptable; and (2) some services and/or ports in the public cloud instance may be configured to only accept connections from inside the public cloud, or only from outside the private enterprise. Second, the DNS name server of the public cloud has been manually configured in the cluster to be deployed. This DNS name server must parse out resolution queries for public cloud addresses to the public cloud DNS name server, and private enterprise addresses to the private enterprise DNS name server. This course of action introduces possible errors and also performance penalties.

BRIEF SUMMARY OF THE INVENTION

Embodiments of the present invention address deficiencies of the art in respect to DNS name server configuration for a hybrid cloud computing environment and provide a novel and non-obvious method, system and computer program product for domain name resolution for a hybrid cloud cluster. In an embodiment of the invention, a method for domain name resolution for a hybrid cloud cluster includes receiving a request for name resolution in a DNS name server proxy executing in memory of a host computer in a public cloud. Thereafter, it can be determined whether or not the request for name resolution implicates a domain name within an Intranet coupled to the proxy over a communications network. Finally, the request for name resolution can be resolved in a DNS name server disposed in the Intranet in response to determining the request to implicate a domain name within the Intranet. Otherwise, the request for name resolution can be resolved in a DNS name server for the public cloud in response to determining the request not to implicate a domain name within the Intranet.

In another embodiment of the invention, a DNS data processing system can be configured for domain name resolution for a hybrid cloud cluster. The system can include a public cloud with a DNS name server providing name resolution for name resolution requests in the public cloud. The system also can include an Intranet separated from the public cloud by a firewall, the public cloud and the Intranet forming a hybrid cloud. The Intranet further can include a DNS name server providing name resolution for name resolution requests in the Intranet. Finally, the system can include a DNS name server proxy disposed in the public cloud. The proxy can include program code enabled to determine whether or not a request for name resolution received in the proxy implicates a domain name within the Intranet and to resolve the request for name resolution in the DNS name server disposed in the Intranet in response to determining the request to implicate a domain name within the Intranet, but to resolve the request for name resolution in the DNS name server for the public cloud in response to determining the request not to implicate a domain name within the Intranet.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 1 is a pictorial illustration of a process for domain name resolution for a hybrid cloud cluster;

FIG. 2 is a schematic illustration of a DNS data processing system configured for domain name resolution for a hybrid cloud cluster; and, FIG. 3 is a flow chart illustrating a process for domain name resolution for a hybrid cloud cluster.

DETAILED DESCRIPTION OF THE INVENTION

Embodiments of the invention provide for domain name resolution for a hybrid cloud cluster. In accordance with an embodiment of the invention, a DNS name server proxy can be deployed as part of a cluster of virtual machines operating in a public cloud computing environment, and the machines in the cluster can be configured to route name resolution requests to the DNS name server proxy. The DNS name server proxy can enjoy a communicative linkage both with a DNS name server local to the public cloud computing environment and also a DNS name disposed behind a firewall in an Intranet. The DNS name server proxy can receive name resolution requests from the cluster of virtual machines and can resolve the requests through the use of the DNS name servers in the public cloud and the Intranet by way of the communicative linkages according to a domain for the requests. For requests implicating the Intranet, the DNS name server in the Intranet can be used. In contrast, for requests implicating domains outside of the Intranet, the DNS name server of the public cloud can be used.

In further illustration, FIG. 1 pictorially shows a process for domain name resolution for a hybrid cloud cluster. As shown in FIG. 1, a private cloud—namely an Intranet 110 protected from public access by way of a firewall 130 can subsist along with a public cloud 120. The public cloud 120 can include a local DNS name server 150. Likewise, the Intranet 110 can include a local DNS name server 140. A cluster of virtual machines 160 can be deployed into the public cloud 120. Finally, a cloud deployment management module 170 can configure and deploy a DNS name server proxy 180 into the public cloud 120 for the cluster of virtual machines 160 to resolve name resolution requests received in the public cloud for names associated with the Intranet 110 using the DNS name server 140 in the Intranet 110, but to use the DNS name server 150 in the public cloud to resolve requests for other names.

The process described in connection with the DNS name server proxy 180 of FIG. 1 can be implemented in a DNS data processing system for hybrid cloud computing. In yet further illustration, FIG. 2 schematically shows a DNS data processing system configured for domain name resolution for a hybrid cloud cluster. The system can include a public cloud communicatively coupled to an Intranet 250 over communicative linkage 260 in order to form a hybrid cloud computing environment. For instance, the communicative linkage 260 can be a secure tunnel.

The public cloud can include one or more host computers 210, each with at least one processor and memory. The host computers 210 cooperatively can be managed by a cloud computing environment 220 upon which multiple different virtual machines 240 can execute in a cluster. The virtual machines 240, in turn, can manage the operation of computer program logic deployed into the cluster of virtual machines 240.

The cloud computing environment 220 also can include one or more DNS name servers 230, for example, those referenced by localhost within the cloud operating environment. Of note, a DNS name server proxy 300 also can be included in the set of virtual machines 240 and the virtual machines 240 can be configured to route name resolution requests to the DNS name server proxy 300. In this regard, the DNS name server proxy 300 can include program code such than when executed by one or more of the host computers 210, can process name resolution requests by using the DNS name server 230 of the public cloud 200 for domains external to the Intranet 250, but by using a DNS name server (not shown) within the Intranet 250 for domains internal to the Intranet 250.

In even yet further illustration of the operation of the DNS name server proxy 300, FIG. 3 is a flow chart illustrating a process for domain name resolution for a hybrid cloud cluster. Beginning in block 310, a DNS name resolution request can be received in the proxy. In decision block 320, it can be determined whether or not the request involves a domain name associated with the Intranet. If so, in block 330 a DNS name server disposed within the Intranet can be used to resolve the domain name of the resolution request. Otherwise, if the request involves a domain name not associated with the Intranet, a DNS name server for the public cloud can be used to resolve the domain name of the resolution request.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for domain name resolution for a hybrid cloud cluster, the method comprising:

receiving a request for name resolution in a domain name system (DNS) name server proxy executing in memory of a virtual machine operating within a host computer in a public cloud;

determining whether or not the request for name resolution implicates a domain name within an Intranet coupled to the DNS name server proxy over a communications network; and, resolving the request for name resolution in a DNS name server disposed in the Intranet in response to determining the request to implicate a domain name within the Intranet, but resolving the request for name resolution in a DNS name server for the public cloud in response to determining the request not to implicate a domain name within the Intranet.

2. The method of claim 1, wherein the Intranet is coupled to the DNS name server proxy in the public cloud over a secure tunnel.

3. The method of claim 1, wherein resolving the request for name resolution in the DNS name server for the public cloud comprises passing the request to localhost in the public cloud.

4. The method of claim 1, wherein receiving the request for name resolution in the DNS name server proxy executing in the memory of the host computer in the public cloud, comprises receiving the request from logic executing in a cluster of virtual machines in the public cloud for name resolution in the DNS name server proxy executing in the memory of the host computer in the public cloud.

* * * * *